United States Patent [19]

Schewe

[11] Patent Number: 4,677,515
[45] Date of Patent: Jun. 30, 1987

[54] THIN-FILM MAGNETIC HEAD FOR WRITING AND READING FOR A RECORDING MEDIUM THAT CAN BE MAGNETIZED VERTICALLY

[75] Inventor: Herbert Schewe, Herzogenaurach, Fed. Rep. of Germany

[73] Assignee: Siemens Aktiengesellschaft, Munich, Fed. Rep. of Germany

[21] Appl. No.: 735,832

[22] Filed: May 20, 1985

[30] Foreign Application Priority Data

May 25, 1984 [DE] Fed. Rep. of Germany ....... 3419650

[51] Int. Cl.$^4$ .............................................. G11B 5/17
[52] U.S. Cl. .................................... 360/123; 360/126
[58] Field of Search ............... 360/125, 123, 113, 119, 360/126

[56] References Cited

U.S. PATENT DOCUMENTS 4,287,544 9/1981 Lazzari ................................. 360/131
4,575,777 3/1986 Hosokawa ........................... 360/123

FOREIGN PATENT DOCUMENTS 0012910 7/1980 European Pat. Off. .
0071489 2/1983 European Pat. Off. .
2924013 1/1980 Fed. Rep. of Germany .

OTHER PUBLICATIONS

IEEE Transactions on Magnetics, vol. Mag-16, No. 1, Jan. 1980, pp. 71-76.
IEEE Transactions on Magnetics, vol. Mag-17, No. 6, Nov. 1981, pp. 2538-2540, 3120-3122.
IEEE Transactions on Magnetics, vol. Mag-18, No. 6, Nov. 1982, pp. 1158-1163, 1170-1172.
IEEE Transactions on Magnetics, vol. Mag-16, No. 5, Sep. 1980, pp. 967-972.
J. Appl. Phys., vol. 53, No. 3, Mar. 1982, pp. 2593-2595.

Primary Examiner—A. J. Heinz
Attorney, Agent, or Firm—Kenyon & Kenyon

[57] ABSTRACT

A magnetic thin film head for writing and reading comprising a stratified build-up on a nonmagnetic substrate for a recording medium that can be magnetized vertically, comprises a ring head-like conducting body for carrying the magnetic flux having two magnet legs, of which the poles facing the recording medium are arranged one behind the other as seen in the direction of motion of the head, and having a predetermined spacing from each other and which delineate a space in between, through which the turns of an at least largely flat coil winding extend. This magnetic head makes possible, with a relatively simple design, a switchable write and read function with high efficiency and in particular produces a large read voltage. The conducting body carrying the magnetic flux further comprises an additional leg part extending over the region of the head part, and, in addition to the flat coil winding serving only for providing a read function, an additional coil winding is provided only for providing a write function, the turns of which are associated only with the additional leg part.

9 Claims, 2 Drawing Figures

THIN-FILM MAGNETIC HEAD FOR WRITING AND READING FOR A RECORDING MEDIUM THAT CAN BE MAGNETIZED VERTICALLY

BACKGROUND OF THE INVENTION

The present invention relates to a thin-film magnetic head for writing and reading, the head having a layer-wise buildup on a nonmagnetic substrate and being used with a recording medium provided with a magnetizable storage layer, into which information can be written along a track by vertical magnetization. Such magnetic heads have a ring-head-like conducting body for carrying the magnetic flux, with two magnet legs, of which the poles facing the recording medium are arranged one behind the other as seen in the direction of motion of the head and have a predetermined spacing from each other, and which delineate a space in between, through which the turns of an at least largely flat coil winding extend. Such a magnetic head is shown, for instance, in European Patent Application EP No. 0 012 910 Al.

The principle of perpendicular magnetization for storing information is generally known (see, for instance, "IEEE Transactions on Magnetics, " vol. MAG-16, no. 1, January 1980, pages 71 to 76; DE-OS No. 29 24 013 or the above mentioned European Patent Application). For this principle, which is often also called vertical magnetization, special recording media in the form of rigid magnetic storage discs, flexible individual discs (floppy discs) or magnetic tapes are required. A corresponding recording medium has at least one magnetizable storage layer of predetermined thickness which contains a magnetically anisotropic material, especially of a CoCr alloy. The axis of the so-called easy magnetization of this layer is oriented perpendicularly to the surface of the medium. By means of a separate magnetic head, the individual sections of information are then written-in along a track as bits in successive sections, also called cells or blocks, by suitable magnetization of the storage layer. In practice, the magnetic flux changes, i.e., the transitions from one direction of magnetization to the opposite one, are used as the information. The bits so obtained have a predetermined extent, also called wavelength, in the longitudinal direction of the track. This dimension can be substantially smaller than the limit which is given by the demagnetization with the method of longitudinal (horizontal) storage. Thus, the information density in the recording medium can advantageously be increased by the principle of vertical magnetization.

The write and read heads known for the principle of longitudinal magnetization, i.e., heads with which the write as well as the read function can be executed, however, cannot be used directly also for vertical magnetization. If these heads, which generally have a ring head-like shape, are used, a conduction of the flux in a circuit closed as far as possible with low magnetic resistance can be achieved also with a flux conduction according to the desired principle of vertical magnetization. However, it is difficult to generate a sufficiently strong writing field in the case of high bit density and an accordingly small gap width of the ring head.

One is therefore compelled to develop special write and read heads for the principle of vertical magnetization. A design of a magnetic head suitable for this purpose comprises, in general, a so-called main pole by which a sufficiently strong vertical magnetic field for reversing the magnetization of the individual sections of the storage layer is generated. A necessary magnetic return can then be achieved, for instance, by means of a so-called auxiliary pole which is located, for instance, on the same side as the main pole (see, for instance, "IEEE Trans. Magn.", vol. MAG-17, no. 6, November 1981, pages 3120 to 3122, or vol. MAG-18, no. 6, November 1982, pages 1158 to 1163; "J. Appl. Phys.", vol. 53, no. 3, 1982, pages 2593 to 2595; DE-OS No. 29 24 013 or the above cited European application).

In this type of magnetic head which is known, for instance, from the above mentioned European Patent Application, the auxiliary pole is to serve in any case only for the return of the magnetic flux. While possible concurrent writing of this pole can be tolerated if necessary if the writing main pole lags behind it and can therefore overwrite information written by the auxiliary pole, the so-called air gap formed between the two poles would have to be relatively wide in order to at least largely suppress concurrent reading of the auxiliary pole with its trailing edge, in order to ensure a far-reaching reduction of the magnetic flux density at the auxiliary pole. Gap layers correspondingly wide are difficult to realize, however, for magnetic heads to be made with a thin-film technique. In addition, the read signal obtainable with magnetic heads of this type is generally relatively weak since in this type, the read as well as the write function must be executed with only a single coil winding.

Because of these difficulties, magnetic heads have also been proposed, in which the use of a special auxiliary pole is dispensed with ("IEEE Trans. Magn.", vol. MAG-18, no. 6, November 1982, pages 1170 to 1172; European Patent Application 0 071 489 A2). For this type of magnetic head, only a single magnet leg is provided which faces the recording medium and with which a planar write and read coil winding is associated. The necessary magnetic return is then accomplished by the stray flux. With such a magnetic head, also called a single-pole head, a sufficiently distinct high-frequency write signal can be generated if the inductivity of the coil winding is not too large. On the other hand, no sufficiently large read signal can be obtained if the auxiliary pole is omitted.

Due to these mentioned problems in reading, systems are also known in which the write and read function can be executed by respective separate heads. These heads can then be adapted better to the respective function (see, for instance, "IEEE Trans. Magn.", vol. MAG-16, no. 5, September 1980, pages 967 to 972). Accordingly, ring heads known per se are used for reading, while the writing must be performed by the mentioned single-pole heads. A known write head suitable for this purpose comprises on its side facing the storage layer of the recording medium, a main pole of a longitudinal extent of, for instance, 3 µm, opposite which is located on the back of the recording medium a substantially large auxiliary pole. The second ring head required only for reading, on the other hand, has a gap width of, for instance, 0.2 µm (see "IEEE Trans. Magn.", vol. MAG-17, no. 6, November 1981, pages 2538 to 2540). Such systems for the magnetic reading and writing with special heads adapted to the respective function, however, are relatively expensive from a design point of view.

SUMMARY OF THE INVENTION

It is, therefore, an object of the present invention to improve the magnetic write and read head mentioned above such that, for one, the mentioned problems with these combined heads are reduced with respect to their mechanical design and, in addition, a switchable write and read function can be ensured with a relatively high efficiency. It should therefore be possible, in particular, to generate a sufficiently large read voltage with this magnetic head.

According to the invention, this and other objects are achieved by the provision that the conducting body carrying the magnetic flux contains, besides the ring head-like part developed by the two magnet legs, an additional leg part extending beyond the region of this head part, and that, in addition to the coil winding serving only for the read function, an additional coil winding is provided only for the write function and the turns of which are associated only with the additional leg part.

Due to this extension of the conducting body carrying the magnetic flux beyond its ring-head-shaped head part by means of the additional leg part and the relationship of the additional coil winding serving only as the write coil merely for this leg part, it can advantageously be achieved that the magnetic head writes the information into the recording medium as a quasi single-pole head, since the write coil winding comes to lie outside of the ring head-like head part formed by the two magnet legs, magnetic fluxes are produced in the two magnet legs by the writing current during the writing function which, in the poles facing the recording medium, are oriented at least largely parallel and perpendicularly to the surface of the medium. The other coil winding which serves as a reading coil, remains without current. On the other hand, the write coil winding is disconnected for reading. The magnetic flux is then closed preferably in the ring head-like head part of the conducting body via the connecting area of the two magnet legs acting as the return. The induced voltage can then be taken off by means of the read coil.

In addition, the advantages connected with the design of the magnetic head according to the invention are seen particularly in the very simple design of the head. The head part facing the recording medium comprises a thin-film ring head already known per se, while the head part adjacent thereto on the side facing away from the recording medium can be produced very simply since there are no complicated structures. The write coil can be fabricated with an advantageously small number of turns; technologically difficult structuring problems in the fabrication of this coil winding therefore can be avoided. On the other hand, the read coil winding which draws only negligible current can advantageously be structured very finely. This means a corresponding increase of the read voltage since the number of turns of this winding can be chosen rather high.

Other advantages, features and objects of the present invention will be apparent from a reading of the detailed description which follows.

BRIEF DESCRIPTION OF THE DRAWINGS

For the further explanation of the invention and its further embodiments, reference is made to the drawings, in which.

DETAILED DESCRIPTION

Figure 1:
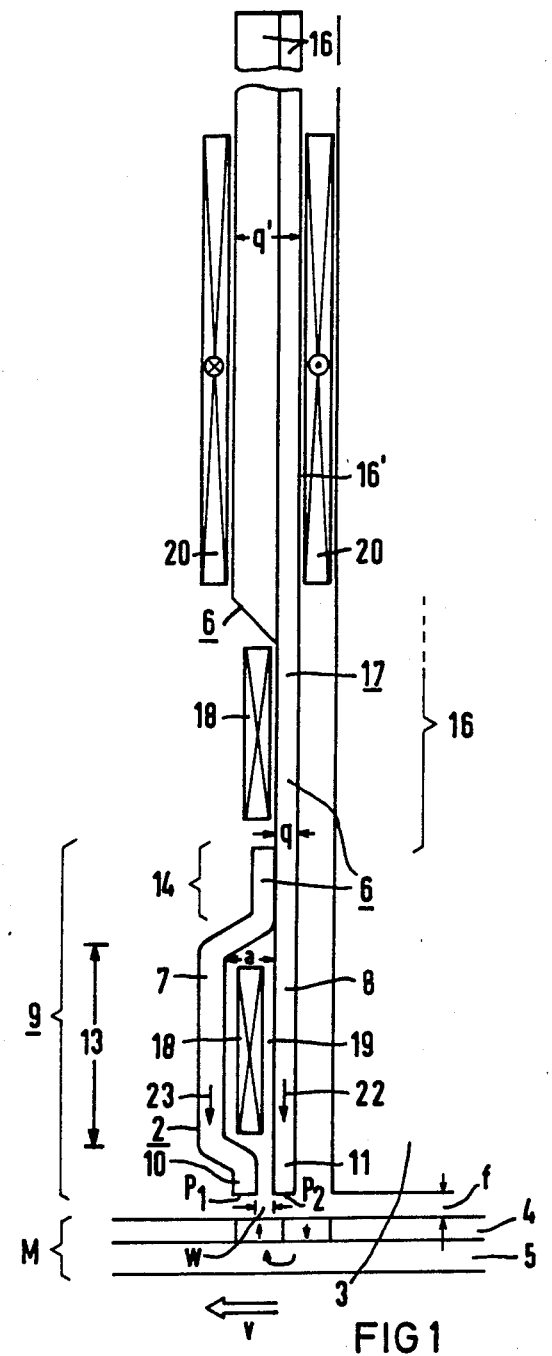
FIG. 1 shows an embodiment of a magnetic head according to the invention illustrated schematically in longitudinal section.

In the magnetic head for writing and reading shown in FIG. 1, ring head-like embodiments for the principle of vertical magnetization known per se are taken as the starting point (see, for instance, the mentioned European Patent applications EP Nos. 0 012 910 A1 or 0 071 489 A2). The head, which is generally designated with 2 and which will be shown during its writing function, is located on the flat side of a substrate 3 which forms the front or back side of a customary element called a flying body which is only indicated partially in the figure. This head can be guided along a track at a small flying height f of, for instance, 0.2 $\mu$m relative to a vertically magnetizable recording medium M, known per se. The recording medium M, for instance, a magnetic storage disc, has a storage layer 4 especially of a CoCr alloy which is optionally connected on its side facing away from the magnetic head 2 to a magnetically soft layer 5, for instance, of a special NiFe alloy. For instance, the recording medium M is conducted under the head. The corresponding direction of motion of the recording medium relative to the magnetic head is indicated by arrow v.

The magnetic head 2 contains a conducting body 6 for carrying the magnetic flux, having two magnet legs 7 and 8 which form a ring head-like head part 9 known per se. These legs are largely oriented, and in particular, at their ends 10 and 11 facing the recording medium M, at least approximately perpendicularly to the surface of the recording medium and form respectively, magnetic poles $P_1$ and $P_2$. Between these two poles, an air gap 12 with an advantageously small longitudinal width of less than 1 $\mu$m and in particular less than 0.3 $\mu$m, pointing in the direction of motion v, is formed. In a central region 13 of the ring head-like head part 9 the distance between the two magnet legs 7 and 8 from the gap width w is increased in that, for instance, the rearward magnet leg 7 (with respect to the direction of motion) leads in this region to a greater distance a relative to the forward straight magnet leg 8 which is closest to the substrate 3. Outside of this region 13, the magnet leg 7 is joined on the side facing away from the recording medium M in a manner known per se in a connection region 14 to the magnet leg 8, so that the ring head-like shape of the head part 9 results.

According to the invention, the conducting body 6 of the magnetic head 2 carrying the magnetic flux is to comprise not only this ring head-like head part 9, but in addition, a leg part 16 which adjoins the connecting region 14 of the head part 9 facing away from the recording medium M. Accordingly, the inner magnet leg 8, which therefore faces the substrate 3, can be extended beyond this connecting region 14, as shown. Particularly, the magnet leg 8 and the leg part 16 can form a common part 17.

Furthermore, a separate coil winding is to be provided, according to the invention, for the write function and the read function, respectively, according to the principle of vertical magnetization. Thus, the turns, in particular, of the multilayered flat coil winding 18 which serves only as the read coil can extend through the space 19 formed between the two pole legs 7 and 8 in the central region 13 and can adjoin, for instance, also a section of the extended leg part 16. However, this coil winding remains without current for the write function assumed in the figure. A further coil winding 20 serves for the write function, which is formed, for instance, by a single wide coil loop or also by several turns. According to the invention, the several turns assumed in the embodiment can be associated only with the extended leg part 16 and preferably surround a region 16' of this leg part. With a provided write current of relatively high intensity, illustrated by the current flow directions shown, the conduction directions of the magnetic flux indicated by arrows 22 and 23 are then formed in the two pole legs 7 and 8, which run at least largely parallel and are directed, for instance, toward the medium M.

The two magnet legs 7 and 8 of the ring head-like head part 9 are then therefore poled like a rod magnet, i.e., the magnetic head 2 according to the invention acts in this case like a single-pole head. Except for this write function, however, the coil winding 20 remains without current so that then the magnetic head 2 with the coil winding 18 is operated as an ordinary ring head because of the magnetic return via the connecting region 14 of the two magnet legs 7 and 8.

As further shown in FIG. 1, the extended leg part 16 has a substantially larger cross section q' carrying the magnetic flux at least in the region 16' of the write coil winding 20 and optionally outside the region of the turns of the read coil winding 18 joining it, than the magnet leg 8 connected thereto with a correspondingly smaller cross section q. Due to the tapering of the cross section formed thereby of the extended leg part 16 between its region 16' and the connecting region 14 and the magnet leg 8, respectively, a corresponding increase of the magnetic field strength is advantageously produced.

Figure 2:
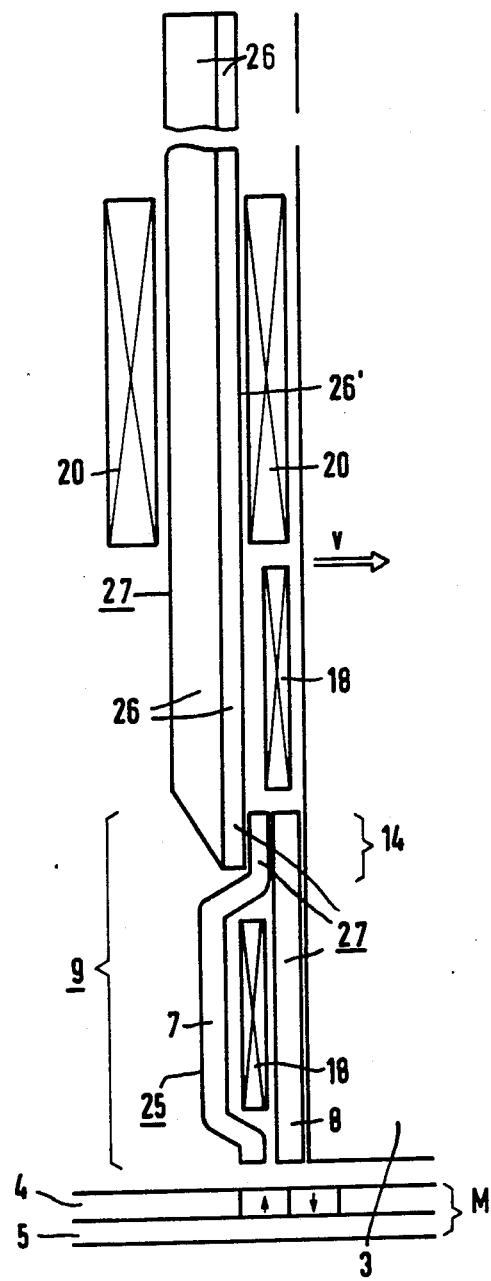
FIG. 2 shows a further embodiment of a magnetic head according to the invention in a similar view.

In the further embodiment of a magnetic head according to the invention shown in FIG. 2, parts agreeing with FIG. 1 are provided with the same reference symbols. This embodiment of the magnetic head, generally designated with 25, differs from the magnetic head 2 according to FIG. 1, substantially only by the special arrangement of the special leg part 26 of its conducting body 27 carrying the magnetic flux joined to the ring head-like head part 9. This leg part is not joined in the connecting region 14 of the two magnet legs 7 and 8 of the ring head-like part 9 located opposite the recording medium M to the magnet leg 8 facing the substrate 3, but directly to the outer magnet leg 7. Also, this magnet leg is equipped, at least in the region 26' of its associated write coil winding 20, with a larger cross section q' for carrying the magnetic flux. According to the embodiment shown, the enlarged cross section q' extends to the connecting region 14.

According to the explanation of the figures, it was assumed that the write coil winding 20 encloses the respective additional extended leg part 16 or 26, respectively. Optionally, however, the turns of the write pole winding can also extend as a planary structure on one flat side of the additional leg part, corresponding to the embodiment of the read coil winding 18 shown in FIG. 1.

The magnetic heads according to the invention are advantageously fabricated with the thin-layer or thin-film technique known per se. The substrate bodies used may comprise, for instance, TiC and $Al_2O_3$. For building up the magnet legs, thin magnetic layers of special NiFe alloys such as permalloy (Ni/Fe-81/19) or of magnetically soft amorphous materials, for instance, FeB, are produced by sputtering, vapor deposition or galvanic-deposition and are separated from each other by nonmagnetic intermediate layers. The easy direction of magnetization can be induced, for instance, while the respective layer is being applied, by an applied magnetic field. In general, it is always perpendicular to the direction of the magnetic flux in the magnetic conducting body, i.e., in the vicinity of the magnet poles $P_1$ and $P_2$, substantially parallel to the surface of the recording medium M. The different grown layers are structured by techniques known per se such as photolithography, plasma-, ion beam or wet chemical etching and thereby the magnet legs of the head are formed. For fabricating the magnet poles provided for the write and read function, layers of Cu or Al or Au are deposited and structured appropriately. The individual insulating layers required for the build-up of the magnetic head are omitted in the figures for reasons of clarity.

It is of particular advantage for the fabrication technology of the magnetic head according to the invention that the part of the head required for fulfilling the read function largely corresponds to the longitudinal heads known heretofore as far as its shape and design are concerned.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawing are, accordingly, to be regarded in an illustrative rather than in a restrictive sense.

What is claimed is:

1. A magnetic thin-film head for writing and reading, comprising a stratified build-up on a nonmagnetic substrate, the head being used with a recording medium which is provided with a magnetizable storage layer into which information can be written along a track by vertical magnetization of the storage layer, which magnetic head comprises a ring head-like conducting body for carrying the magnetic flux and being disposed in a first region adjacent the medium and having two magnet legs, the poles of the legs facing the recording medium being arranged one behind the other as viewed in a direction of relative motion of the head with respect to the medium and having a predetermined distance from each other of less than 1 $\mu$m, said magnet legs delineating a space through which the turns of an at least largely flat first coil winding extend, said conducting body comprising an additional leg part extending beyond said first region in a direction away from the recording medium, said first coil winding serving only for providing a read function, and further comprising an additional coil winding serving only for providing a write function, the turns of said additional coil winding being associated with the additional leg part, the magnetic fluxes in the magnet legs during said write function being oriented at least largely parallel to each other and perpendicularly to a surface of the storage layer.

2. The magnetic head recited in claim 1, wherein the leg part extending beyond the first region forms a common structural part with one of the magnet legs.

3. The magnetic head recited in claim 1, wherein the additional coil winding comprises one or more turns in at least one plane.

4. The magnetic head recited in claim 3, wherein the at least one turn of the additional coil winding encloses the additional leg part.

5. The magnetic head recited in claim 3, wherein the at least one turn of the additional coil winding adjoins at least partly the additional leg part as a planar structure.

6. The magnetic head recited in claim 3, wherein the leg part extending beyond the first region has, at least in a second region wherein the at least one turn of the additional coil winding is disposed, a cross section for carrying the magnetic flux which is larger than the cross section of the additional leg part in a region where the additional leg part connects to at least one of said magnet legs.

7. The magnetic head recited in claim 1, wherein the turns of the first coil winding comprise a planar structure also adjoining the additional leg part.

8. The magnetic head recited in claim 1, wherein the conducting body comprises a magnetically soft material.

9. The magnetic head recited in claim 1, wherein the conducting body comprises a material, the easy magnetization of which is oriented at least largely perpendicularly to the conduction direction of the magnetic flux.

* * * * *